Figure 4:
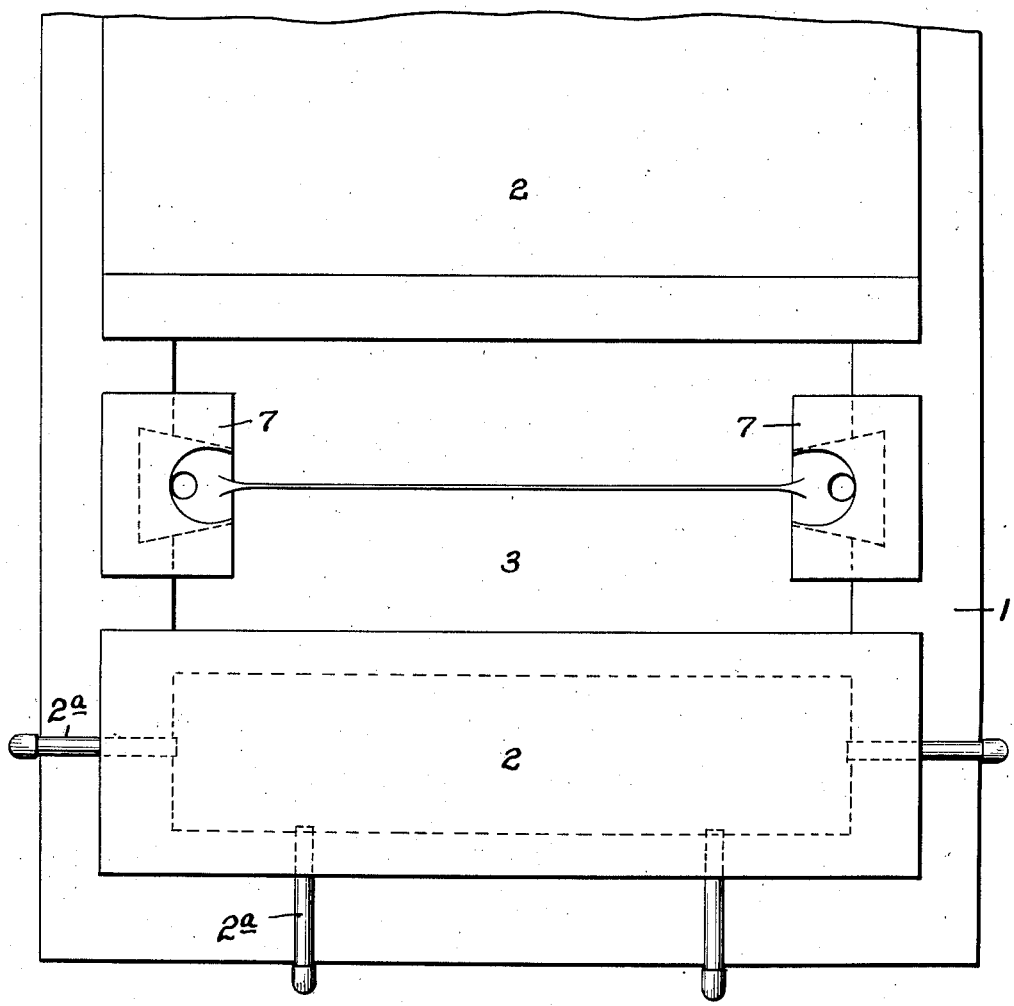

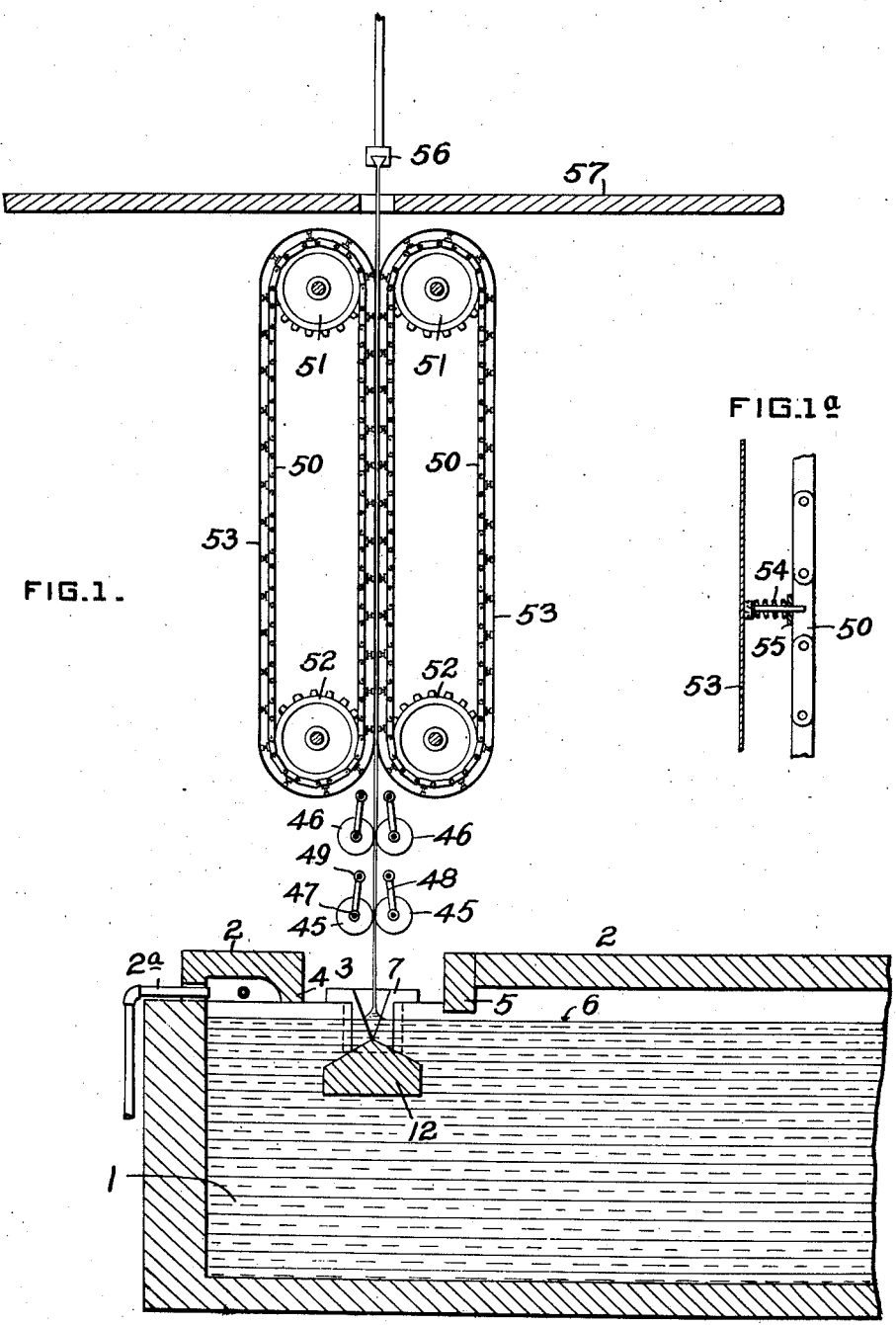

H. G. SLINGLUFF.
GLASS DRAWING PROCESS.
APPLICATION FILED MAR. 28, 1918.
1,364,895.
Patented Jan. 11, 1921.
5 SHEETS—SHEET 2.
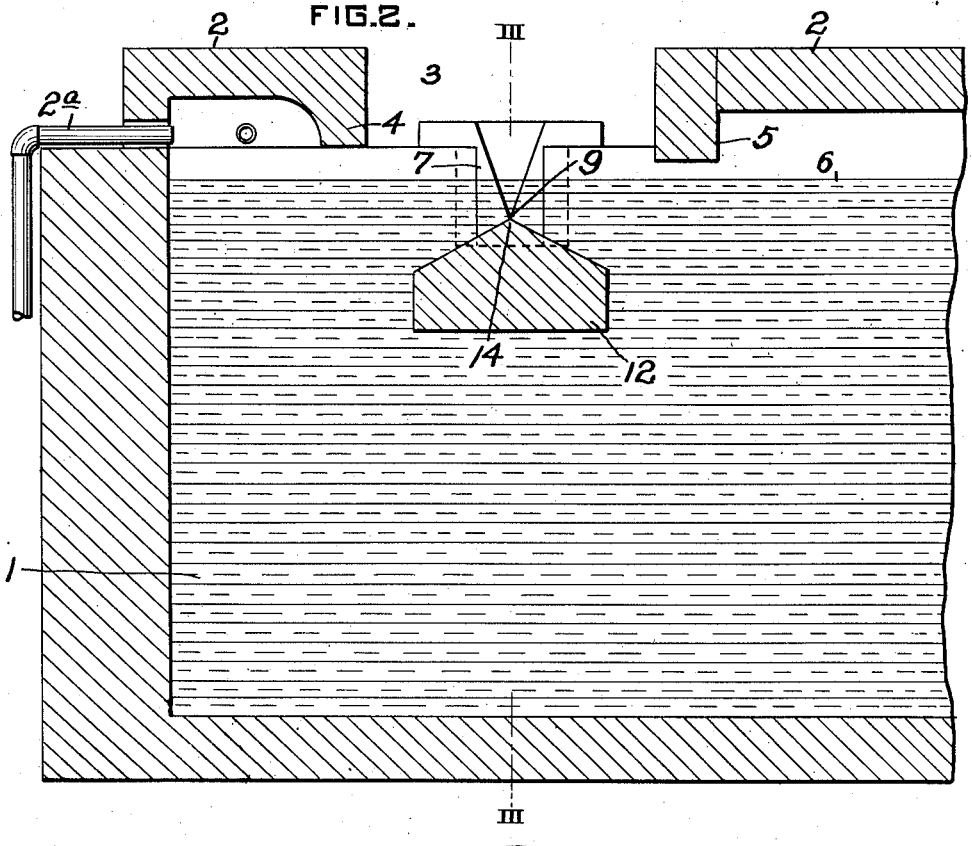
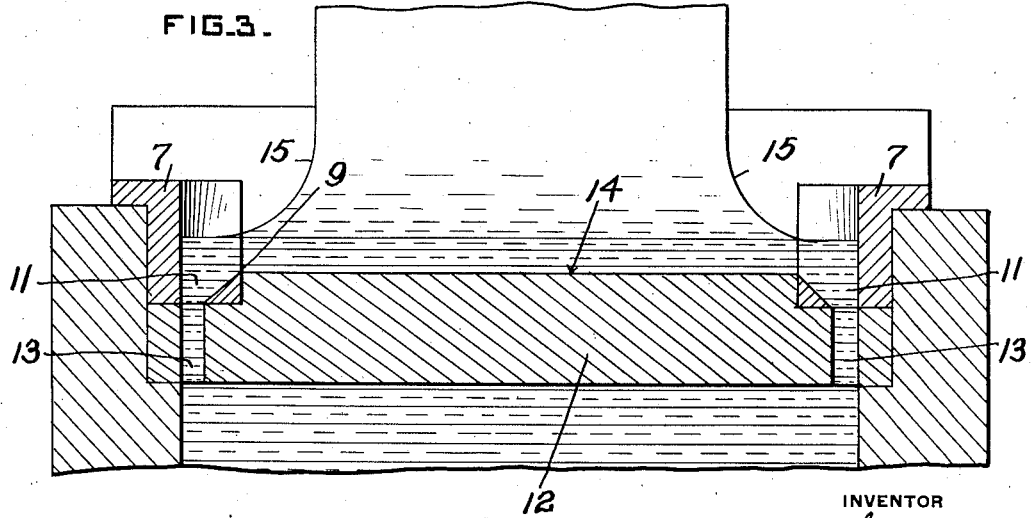
INVENTOR
H. G. Slingluff.
James C. Bradley
atty

H. G. SLINGLUFF.
GLASS DRAWING PROCESS.
APPLICATION FILED MAR. 28, 1918.

1,364,895.

Patented Jan. 11, 1921.
5 SHEETS—SHEET 3.

INVENTOR

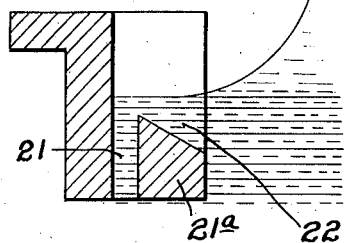
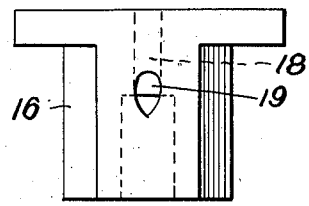
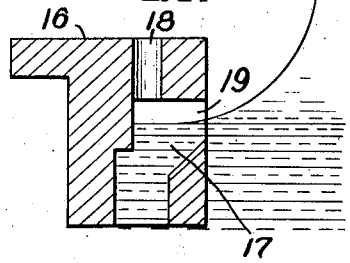
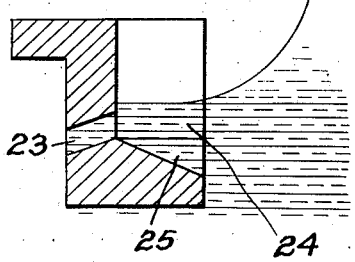
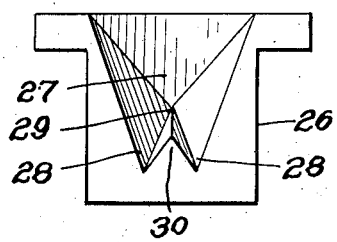
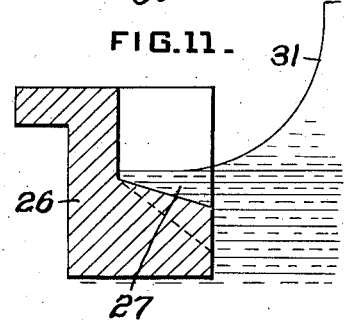
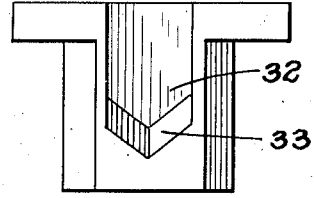
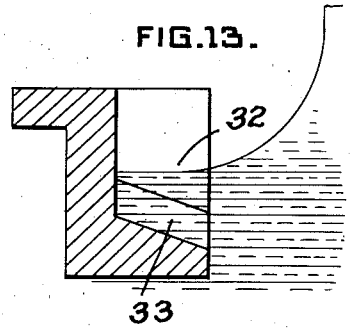

H. G. SLINGLUFF.
GLASS DRAWING PROCESS.
APPLICATION FILED MAR. 28, 1918.
1,364,895.
Patented Jan. 11, 1921.
5 SHEETS—SHEET 5.
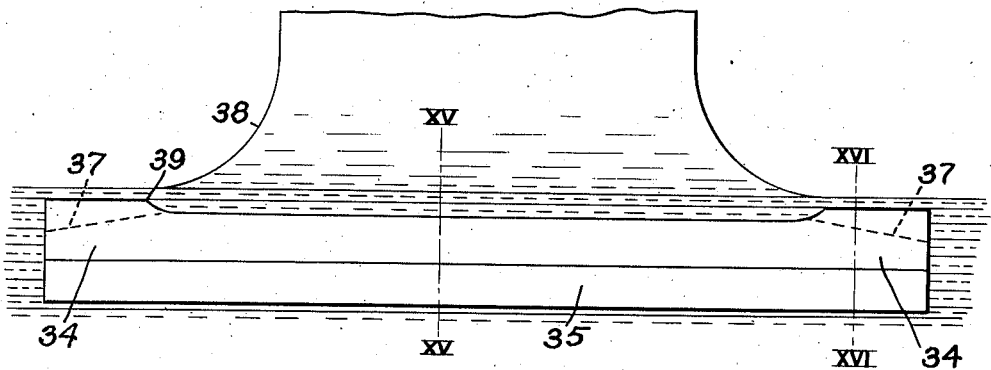
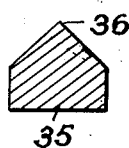
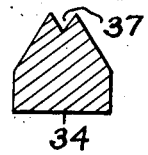
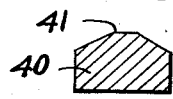
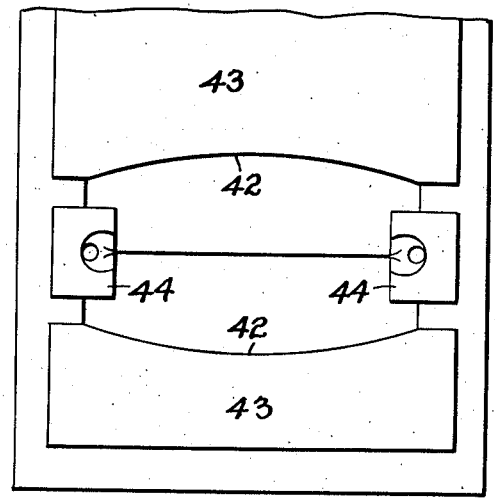
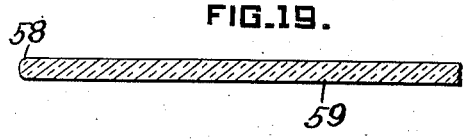
INVENTOR
H. G. Slingluff.
by James C. Bradley
Atty.

UNITED STATES PATENT OFFICE.

HARRY G. SLINGLUFF, OF MOUNT VERNON, OHIO, ASSIGNOR TO PITTSBURGH PLATE GLASS COMPANY, OF PITTSBURGH, PENNSYLVANIA, A CORPORATION OF PENNSYLVANIA.

GLASS-DRAWING PROCESS.

1,364,895.  Specification of Letters Patent.  Patented Jan. 11, 1921.

Application filed March 28, 1918. Serial No. 225,190.

*To all whom it may concern:*

Be it known that I, HARRY G. SLINGLUFF, a citizen of the United States, residing at Mount Vernon, in the county of Knox and State of Ohio, have invented certain new and useful Improvements in Glass-Drawing Processes, of which the following is a specification.

Figure 5:
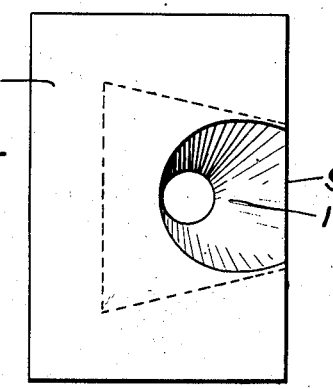

The invention relates to a process for drawing glass in sheet form. It has for its primary objects the provision of an improved process: (1) whereby the thickness and position of the side edges are maintained and a sheet of substantially uniform width produced; (2) whereby the line of generation of the sheet is prevented from moving back and forth in the bath of glass from which it is drawn; (3) whereby a sheet substantially free from the lines characteristic of sheet glass as hereto drawn from a slot or from too close contact with a forming body or from glass which is too cool, is secured; (4) whereby glass of single strength thickness or even less may be drawn; (5) whereby the glass sheet drawn may be straightened both horizontally and vertically without marring, before annealing and during the drawing operation; (6) whereby the glass may be annealed as it is drawn without reheating it; (7) and in general whereby a perfectly flat annealed sheet of glass of substantially uniform thickness from edge to edge may be made in a continuous unitary operation. Various forms of apparatus and means for practising the invention are illustrated in the accompanying drawings, wherein:

Figure 1 is a vertical section through one form of apparatus for carrying out the invention; Fig. 1ª is an enlarged vertical section taken through the chain and band of Fig. 1; Fig. 2 is a vertical section through the tank employed on a scale larger than that of Fig. 1; Fig. 3 is a section of the line III—III of Fig. 2; Fig. 4 is a plan view of the tank employed; Fig. 5 is a plan view of the drawing block; Fig. 6 is a vertical section through a different form of block; Figs. 7 and 8 are front elevation and vertical sectional views respectively of a modified form of drawing block which may be employed; Fig. 9 is a vertical section through another type of drawing block slightly different from that of Fig. 6; Figs. 10 and 11 are front elevation and vertical sectional views respectively of another type of drawing block which may be employed; Figs. 12 and 13 are front elevation and vertical sectional views respectively of another type of drawing block; Fig. 14 is a side elevation of a combined forming bar and edge maintaining devices by means of which the process may be carried out; Figs. 15 and 16 are sections of the lines XV and XVI respectively of Fig. 14; Fig. 17 illustrates in plan view diagrammatically another means whereby the chilling of the surface of the glass may be accomplished; Fig. 18 illustrates in section a modified form of forming bar which may be employed in place of that of Figs. 1 and 2; and Fig. 19 shows an enlarged section of edge of the sheet of glass which is drawn by means of the process.

Referring first to the construction as illustrated in Figs. 1, 2 and 6 with which the process is preferably carried out, the reference numeral 1 indicates the drawing tank which is connected at its right hand end with a suitable melting tank (not shown). The drawing tank is provided with a top 2, and a drawing opening 3, the top 2 being provided with depending portions or curtain blocks 4 and 5, approaching relatively close to the surface of the glass as indicated by the line 6. The glass in the left hand portion of the tank is heated by means of the gas burners 2ª. Mounted at opposite sides of the drawing opening 3 are the drawing blocks 7, such blocks being preferably dove tailed into the vertical side walls of the furnace as indicated in dotted lines in Fig. 4 so that the blocks may be removed for replacement or may be adjusted in vertical position depending upon the height of the glass in the tank.

The faces of the blocks are cut away as indicated in Figs. 2, 3, 4 and 5. The face of each block having a cut out portion of V form is indicated in Fig. 2. The point of the V terminates at 9 (Fig. 3) about two or two and one-quarter inches below the surface of the glass and from this point the cut out portion extends rearwardly and downwardly as indicated at 11.

The tank is also provided with a guiding or chilling bar 12 lying beneath the line of generation of the sheet and having its ends held down by means of the drawing blocks 7 as indicated in Fig. 3. A similar bar is shown in my Patent 1,339,299, issued May 4, 1920. The bar is provided at these ends with vertical openings 13, registering with the openings 11 in the drawing blocks 7, so that a flow of glass is permitted from the main body of glass upwardly into the receiving pockets 11 in the blocks 7.

The block 12 is preferably made relatively wide and provided on its upper side with a ridge or peak 14 which extends as close to the surface of the glass as is possible without causing any marring or lining in the sheet produced. In practice this distance may be as little as one and one-half inches, and the closer it is to the surface of the glass, the greater is the effect secured in preventing wandering or movement of the line of generation of the sheet over the surface of the bath. The glass in the bath immediately above the peak 14 is cooler than that on either side and the glass tends to pull from the coolest and most viscous portion so that the provision of the peak 14 tends to keep the plane of the glass sheet immediately above the peak. The provision of the bar 12 also tends to promote speed of drawing since the glass from which the drawing occurs is cooler than would be the case if no chilling member were used. The vertical position of this bar may be adjusted in connection with the drawing block 7 or independent adjustment may be secured by interposing refractory strips between the lower ends of the drawing blocks and the ends of the bar.

The provision of the pockets 11 in the drawing blocks 7 tends to keep the edges 15 of the sheet from drawing in, as the drawing operation progresses. The blocks 7 act as cooling members for the pockets of glass 11, such glass being rendered more viscous than the body of glass in the tank. As a result these pockets of glass adhere to the clay of the blocks and to the edges 15 forming a viscous bond or anchor from which the edges 15 are stretched out or drawn. These edges being cooler and stiffer than the main body of the sheet, maintain their position despite the normal tendency of the sheet to narrow down as the drawing progresses. The pockets of glass 11 are resupplied with relatively hot glass from beneath through the passages 13 and through the passages in the blocks 7 themselves. New glass is thus supplied to take the place of the glass drawn out in the edges 15, and this supply of glass tends to maintain the condition of the glass in the pockets so that continuous and uniform drawing may occur. If it were not for this supply of fresh glass, the glass in the pockets would gradually become more viscous and the edges 15 thicken up, thus destroying the uniformity of the edge and eventually interfering with the further production of the sheet. The V shape in the opening leading into the pocket as indicated in Fig. 2, not only promotes the anchoring of the edge of the sheet to the block, but also tends to hold the edge against lateral movement as the edge naturally tends to maintain its alinement with the point of the V.

Various other arrangements might be provided for securing the pockets of chilled glass and the necessary supply of fresh glass thereto from a proper source. One form somewhat similar to that shown in my Patent # 1,251,932 issued January 1st, 1918, is illustrated in Figs. 7 and 8 in which the drawing block 16 is provided with a pocket 17 opening at its lower end into the glass beneath the block and having a vertical opening 18 at its upper end and a lateral opening 19 leading into the tank. The glass is chilled by contact with the body of clay and may be further chilled by a supply of air through the passage 18. The form of block of Figs. 2 and 3 provides for a better cooling effect without the use of a blast, but if a blast is employed the construction of Figs. 7 and 8 gives better opportunity for the effective application of a cooling supply of air.

Fig. 6 illustrates a slight modification over the block construction of Fig. 3, in that the opening 21 is smaller, the clay 21ª not being cut away as in Fig. 3. The segregation of the body of glass 22 corresponding to the pocket 11, is not so complete as in the construction of Fig. 3 and the result secured is not quite so effective as the construction of Fig. 3.

Fig. 9 illustrates a modification of Fig. 3 in which the passage 23 for supplying fresh glass to the pocket 24 extends laterally as well as downwardly instead of extending vertically as in the construction of Fig. 3. The bottom of the recess 24 is in the form of a V-shaped groove 25 to permit a freer flow into the pocket from the front of the block.

Figs. 10 and 11 illustrate a still greater departure in the construction of the drawing block. The block 26 in this construction is provided with a recess or pocket 27 having at its lower end a pair of grooves or passages 28 decreasing in depth from their outer to their inner ends 29. The inverted V portion 30 between the two grooves tends to maintain the edge 31 of the sheet being drawn in position. The process of maintaining the width of the sheet is the same here as in the other forms, the pocket 27 of chilled glass being secured in the block 26 and forming an anchor for the edge of the sheet whereby such edge is attached to the block, while the grooves 28 act as passages whereby the supply of relatively hot glass is provided for replenishing the supply of glass in the pocket as it is drawn out by the edge of the sheet.

Figs. 12 and 13 show a modification somewhat along the lines as that of Figs. 10 and 11, the block or wall of the furnace being provided with a pocket or recess 32 for chilling the body of glass. The bottom of the recess tapers, forming a groove 33 through which a supply of relatively hot glass may flow to the pocket. This form of construction does not provide the free flow of glass to the pocket that the preceding constructions provide, and is less desirable for this reason, the glass having a greater tendency to thicken up gradually in the pocket and form a thicker and thicker edge to the sheet being drawn.

Figs. 14 and 16 illustrate a further modification wherein the drawing blocks 34 are made integral with the guiding bar 35. The guiding bar 35 is made of the cross section indicated in Fig. 15, the peak 36 lying preferably about one and one-half inches below the surface of the glass. The drawing blocks 34 are provided with grooves 37 as shown in Fig. 16, the bottoms of the grooves being indicated by the dotted lines in Fig. 14. The anchoring of the glass occurs between the edges 38 and the projections 39 at which points the grooves 37 terminate. The grooves gradually increase in depth from their inner to their outer ends and provide passages for a supply of hotter glass to the points of formation of the sheet edges. The proximity of the upper portions of the drawing block members to the surface of the glass provides bodies of glass lying above such blocks which are relatively cooler than the main body of glass, and this relatively cooler and more viscous glass provides the bond between the edges of the sheet and the projections or shoulders 39.

Fig. 18 illustrates another modification in cross section of a guiding bar which has proven very satisfactory, such bar 40 being relatively much wider than the bar shown in Fig. 2. With this bar the flat upper surface 41 is placed about four inches beneath the surface of the glass. The bar tends to cool the glass lying above it but does not have as great an effect in preventing movement of the sheet as is the case with the bar 12 of Fig. 2, and the glass can not be pulled as rapidly as with the bar located closer to the surface of the glass. Various other forms of guiding bars might be employed or the bar may be dispensed with entirely if the surface of the glass from which the drawing occurs is chilled in some other way in order to secure the desired speed of drawing. Such other means would not, of course, perform the function of maintaining the line of generation of the sheet in the same position at all times. Various means are known in the art for chilling the surface of the glass from above by means of radiation, and this may be accomplished to a certain extent, in case the shielding bar is dispensed with, by increasing drawing opening between the members 4 and 5 (Fig. 2). This may also be accomplished by cutting out the inner faces of the members 4 and 5 along the curved lines 42 as indicated in Fig. 17, which would increase the area at the surface of the glass subjected to the cooling effect of the atmosphere, the members 43 in this construction constituting the top of the tank and the members 44 being the drawing blocks.

In case the guiding effect of the bar 12 is dispensed with, a tendency of the sheet drawn is to bow either toward the member 4 or the member 5 (Fig. 2), depending upon which side of the body of glass beneath the drawing opening is hottest so that the sheet drawn will not be flat but will be slightly curved in a horizontal plane. In case the glass is not annealed as drawn, this curvature may be taken advantage of in the flattening operation after the sheets of glass are cut off, and before annealing. With this curved form of sheet, the heat has better access to the lower side of the sheet when it is placed convex side down upon a flattening stone, and it will flatten more readily than if the sheet was of a more nearly approximate flatness at the time it was placed upon the flattening stone.

However, the preferred method of drawing the sheet is to draw it perfectly flat in which the use of the bar 12 with the peak 14 assists materially, since the line of generation of the sheet is kept straight. If the glass warps either in a vertical or horizontal plane, as it is drawn up, it may be straightened without marring and while still retaining sufficient heat to be readily bent, by the sets of rollers 45 and 46 shown in Fig. 1. Each set of rollers (spaced about six inches apart and extending from one side of the sheet to the other) is mounted upon a bar 47 and this bar is suspended so as to swing freely back and forth by means of hangers 48 pivoted at their upper ends to bars 49. The bars are positioned so that the rollers bear lightly against the surface of the glass. One set of rollers is sufficient to straighten any curve in the glass in a horizontal direction, but the two sets are necessary, one above the other, in order to straighten bends in a vertical direction. The vertical position of the rolls and the force with which they engage the glass can be regulated so that they will perform their function without marring the glass provided their surfaces are of the proper material. For this purpose asbestos can be used, although the best material is crucible carbon, which is not affected by the heat and which will not mark the glass under relatively light pressure.

Above the sets of rolls 45 and 46 are a pair of endless sprocket chains 50 passing over the sprockets 51 and 52. The upper sprockets are suitably driven from a suitable source of power. Mounted on the chains but spaced away therefrom are a pair of endless bands 53 of asbestos which follow the movement of the chains. These bands are a little wider than the sheet of glass being drawn and are pressed inward from the chains by spring pressed plungers 54 (Fig. 1ª), having asbestos pads on the end and arranged in series on bars 55 extending across the chains, so that the inner flights of the bands press yieldingly against the sheet of glass passing therethrough. These bands pressing yieldingly against the sheet and gripping it, act as a drawing means for the sheet, it being understood that the drawing is started by the use of a bait 56 (Fig. 1) of any desired form, which is dipped into the glass and pulled up between the asbestos bands when the drawing is first started. After the bait passes the floor 57, it is cut off, and subsequently as the drawing progresses, the sheet is cut off in sections as it rises above the floor 57.

The asbestos bands not only serve as a satisfactory means for gripping the sheet and acting as drawing members, but also perform the still more important function of acting as heat insulating means for the glass so that it is annealed during its passage from the lower ends of the belts to their upper ends, the glass emerging in an annealed condition so that there is no difficulty in cutting it off either with a diamond or with an electrically heated wire, and the glass thus cut off requires no further annealing or treatment of any kind, being flat, of substantially the same thickness throughout and perfectly annealed.

Fig. 19 illustrates a portion of a sheet drawn by my improved process, the outer portion of edge 58 being of substantially the same thickness as the body of glass 59 lying inward therefrom. In some cases this edge 58 may be a trifle thicker than the inner portion 49, but if desired, by regulating the conditions at the drawing blocks, the edge may be made slightly thinner than the body portion of the glass. This feature of drawing the edge of the glass relatively thin, is of importance, since in this way, the strains incident to a very thick edge are avoided, the cutting and annealing of the glass is made easier, and in case it becomes necessary to flatten any of the sheets, it is much easier to flatten a sheet of this character than it is one with a thick edge. The amount of usable glass in the sheet is also increased, as with a thick edge it becomes necessary to cut off a considerable strip along the edge, thus decreasing the production.

As indicated by the drawings, the apparatus employed is capable of wide variation and the process is not limited to the use in connection with any particular form of apparatus. The drawing blocks and guiding bar are shown in various forms and might be further modified to suit varying conditions. In some cases it may be desirable to increase the chilling effect of the forming bar at its central portion where the glass is hottest by increasing the size of the bar, changing its shape or bringing it closer to the surface of the glass, and the speed of draw will depend upon the depth of the bar, its shape and its size. The speed of draw may also be varied by cooling the bar by the use of air or liquid passages, such expedients for increasing the chilling effect in a body of glass to increase the speed of draw being well known in the art and requiring no illustration. Wide variation is also possible in the means employed for pulling the glass from the bath, annealing and handling it.

What I claim is:

1. The process of maintaining the thickness and position of the edge of a sheet of glass, which consists in drawing the sheet from a relatively large, deep body of molten glass, chilling such edge at the point of its generation or emergence from the body in the glass so that the glass is made viscous and relatively adherent with respect to the chilling body, and at the same time providing a flow of relatively hot glass from said large, deep body of glass through a cooling passage in the chilling body to such point of generation from a point remote therefrom.

2. The process of maintaining the thickness and position of the edge of a sheet of glass being drawn, which consists in drawing the sheet from a relatively large, deep body of molten glass chilling such edge at the point of its generation or emergence from the body in the glass so that the glass is made viscous and relatively adherent with respect to the chilling body, and at the same time providing a flow of relatively hot glass through the chilling body from such large, deep body of glass to such point of generation from a point remote therefrom.

3. The process of maintaining the thickness and position of the edge of a sheet of glass, which consists in drawing the sheet from a relatively large, deep body of molten glass, chilling such edge at the point of its generation or emergence from the body in the glass so that the glass is made viscous and relatively adherent with respect to the chilling body, and at the same time providing a supply current of glass from the main body of molten glass through the chilling body to such point of generation, such supply current being segregated between its inlet and outlet ends from the main body of molten glass.

4. The process of drawing a glass sheet from a relatively large deep body of molten glass, which consists in segregating the layer of glass beneath the line of generation of the sheet from the main body of glass therebeneath and drawing the sheet upward with such line of generation remote laterally in both directions from any anchoring or chilling body of clay or refractory material in the body of glass.

5. The process of drawing a glass sheet from a body of molten glass, which consists in segregating the layer of glass beneath the line of generation of the sheet by refractory guiding means lying in the body of glass intermediate the line of generation and the bottom of the body of glass, and drawing the sheet upward with the line of generation of the sheet remote laterally from any anchoring or chilling body of clay or refractory material in the body of glass.

6. The process of drawing a glass sheet from a relatively large deep body of molten glass, which consists in segregating the layer of glass beneath the line of generation of the sheet from the main body of glass therebeneath, anchoring the end edges of the sheet to refractory means lying in the body of glass, and drawing the sheet upward with such line of generation remote laterally in both directions from any anchoring or chilling body of clay or refractory material in the body of glass.

7. The process of drawing a glass sheet from a body of molten glass, which consists in segregating the surface layer of glass beneath the line of generation of the sheet by refractory guiding means lying in the body of glass below the line of generation and spaced above the bottom of the body of glass, anchoring the end edges of the sheet to refractory means lying in the body of glass and drawing the sheet upward with the line of generation remote laterally from any anchoring or chilling body of clay or refractory material in the body of glass.

8. The process of maintaining the thickness and position of the edge of a sheet of glass being drawn from a body of molten glass, which consists in providing a recess in a refractory body adapted to carry a chilled pocket of glass at the point of generation of the edge, thus anchoring the edge to the refractory body, continuously drawing the edge from the chilled pocket and providing a flow of relatively hot glass through the refractory body to the pocket to take the place of that drawn out, such supply current being segregated between its inlet and outlet ends from the main body of molten glass.

9. The process of maintaining the thickness and position of the edge of a sheet of glass being drawn from a body of molten glass, which consists in chilling a pocket communicating with said body of glass to provide an anchoring means, continuously drawing the edge from the relatively viscous glass of the pocket, and at the same time providing a flow of hotter glass through a cooling passage to such pocket to take the place of the glass drawn out by the edge.

10. The process of drawing sheet glass from a body of molten glass, which consists in segregating the surface layer of glass beneath the line of generation of the sheet, cooling pockets of glass at the ends of the sheet for anchoring the end edges to the relatively viscous glass of the pockets, drawing the sheet upward, and supplying relatively hot glass to the pockets through cooling passages from points remote therefrom to take the place of the glass drawn therefrom by the edges.

11. The process of drawing sheet glass from a body of molten glass which consists in segregating the surface layer of glass beneath the line of generation of the sheet, cooling pockets of glass at the ends of the sheet for anchoring the end edges to the relatively viscous glass of the pockets, drawing the sheet upward, and supplying relatively hot glass to the pockets through cooling passages to take the place of the glass drawn out by the edges.

12. The process of drawing sheet glass from a body of molten glass which consists in segregating the surface layer of glass beneath the line of generation of the sheet, cooling pockets of glass at the ends of the sheets for anchoring the end edges to the relatively viscous glass of the pockets, drawing the sheet upward with the line of generation remote laterally in both directions from any anchoring or chilling body of material in the body of glass.

HARRY G. SLINGLUFF.